Patented Nov. 1, 1932

1,885,940

UNITED STATES PATENT OFFICE

KENNETH S. MOWLDS, OF HILLCREST, AND WILLIAM SEGUINE, JR., OF NEWPORT, DELAWARE, ASSIGNORS, BY MESNE ASSIGNMENTS, TO KREBS PIGMENT & COLOR CORPORATION, OF WILMINGTON, DELAWARE, A CORPORATION OF DELAWARE

MANUFACTURE OF SUNFAST AND INERT LITHOPONE

No Drawing.  Application filed September 21, 1929.  Serial No. 394,378.

This invention relates to lithopone. More particularly it relates to the removal of zinc oxide from lithopone. Still more particularly it relates to a process for removing zinc oxide from lithopone which does not deleteriously effect the light-resisting qualities of the finished product.

Lithopone is a white pigment consisting usually of approximately equi-molecular quantities of barium sulphate and zinc sulphide. It is customarily made by the mutual precipitation of these two compounds from solutions of barium sulfide and zinc sulfate. The precipitate, which is known as raw or crude lithopone, is filtered, dried, calcined at red heat, quenched in water, ground, washed, dried and disintegrated. The final or finished lithopone usually contains varying amounts of zinc oxide up to 3%. When lithopone containing a quantity of zinc oxide is ground in oil or other vehicles the zinc oxide causes livering or thickening. In U. S. Patent 1,540,456 J. E. Booge describes the acid washing of finished lithopone, and in U. S. Patent 1,619,376 Herman G. Schanche describes an improvement in light resistance when acid treating high chlorine lithopone.

We have found that while the advantages described in these patents are obtained, the acid treatment causes a certain amount of deterioration of the light-resisting qualities particularly of those lithopones which have a relatively high chlorine content and whose light-resisting properties have been built up by the use of catalysts.

This invention has as an object the removal of zinc oxide without causing deterioration of light-resisting properties of lithopone.

A further object is the use of a lixiviant in the removing of zinc oxide which can be separated without difficulty from the lithopone and zinc oxide solution.

These objects are accomplished by the following invention which consists in treating the lithopone with an alkaline solution such as ammonia, caustic soda, caustic potash and the like. Although alkalis in general are suitable for this purpose, we have found that solutions of ammonia containing carbonate, sulfate, chloride, sulphite, sulphide, borate, or oxalate radicals can be advantageously used. In practice the low cost and easy recovery of ammonium carbonate make it a most desirable lixiviant.

In the practice of our invention we suspend the finished lithopone, preferably after wet grinding, in dilute ammonia and pass carbon dioxide through the pulp until the bulk of the zinc oxide is in solution. We then wash the pigment by filtration or decantation. The filtrate, or decant, is then boiled to distill off the ammonia as a gas. This ammonia can be condensed, by suitable means, for reuse. The precipitated zinc carbonate is stored in a sludge tank and from time to time filtered off and recovered for reuse in the zinc dissolving operation, for the production of zinc sulphate.

It has been found that this process works excellently not only with lithopones of ordinary grade but with lithopones that contain more 30% zinc sulphide.

The advantages of the invention are the removal of zinc oxide from lithopone without injuriously affecting the light-resisting qualities of the lithopone, the removal of zinc oxide from lithopone without the use of acid, the use of a reagent that can be recovered along with the zinc oxide extracted and whose traces, being easily volatilized, are automatically removed when the lithopone is dried.

Another advantage is the production of a lithopone high in chlorine which contains more than 30% zinc sulphide and less than .2% zinc oxide.

As many apparently widely different embodiments of this invention may be made without departing from the spirit and scope thereof, it is to be understood that we do not limit ourselves to the specific embodiments thereof except as defined in the appended claims.

We claim:

1. The method of removing zinc oxide from heat treated lithopone which consists in treating the lithopone with dilute ammonium carbonate.

2. The process of removing zinc oxide from heat treated lithopone consisting in suspending the lithopone in an ammonia solution, in passing carbon dioxide through the suspension and separating the zinc-oxide-containing solution from the lithopone.

3. The process of removing zinc oxide from heat treated lithopone consisting in suspending the lithopone in ammonia, in passing carbon dioxide through the suspension until the bulk of zinc oxide is in solution, in separating the solution from the lithopone, and in separating the ammonia from the solution.

4. The process of removing zinc oxide from heat treated lithopone which contains a relatively high percentage of chlorine consisting in wet grinding the finished lithopone, in suspending the lithopone in dilute ammonium hydroxide, in passing carbon dioxide through the suspension until the bulk of zinc oxide is in solution, in separating the solution from the lithopone, in washing the lithopone, and in separating ammonia from the solution by heating.

5. The process of removing zinc oxide from heat treated lithopone consisting in leaching with a lixiviant containing one of a class of compounds consisting of ammonia or ammonium salts, in heating the lixiviant, in absorbing the expelled ammonia and in using the ammonia solution in further processing.

6. The method of extracting zinc oxide from heat treated lithopone consisting in leaching with a solution of an ammonium compound and separating the solution containing the zinc compound formed from the lithopone, the solution being such that its traces will be volatilized from the lithopone when the lithopone is dried.

7. The process of removing zinc oxide from calcined lithopone which contains a relatively high percentage of chlorine consisting in wet grinding the calcined lithopone, in suspending the lithopone in dilute ammonium hydroxide, in passing carbon dioxide through the suspension until the bulk of zinc oxide is dissolved and in separating the solution from the lithopone.

8. The process of removing zinc oxide from calcined lithopone consisting in suspending the lithopone in ammonia, passing carbon dioxide through the suspension until the bulk of zinc oxide is in solution and separating the solution from the lithopone.

In testimony whereof we affix our signatures.

WILLIAM SEGUINE, Jr.
KENNETH S. MOWLDS.